United States Patent
Gopalakrishna et al.

(10) Patent No.: US 12,443,767 B2
(45) Date of Patent: Oct. 14, 2025

(54) SYSTEMS AND METHODS FOR IDENTIFYING PERIPHERAL DEVICES AND LOGGING OPERATIONS PERFORMED THEREON

(71) Applicant: DigiCert, Inc., Lehi, UT (US)

(72) Inventors: Naveen Gopalakrishna, Bangalore (IN); Avesta Hojjati, Austin, TX (US)

(73) Assignee: DigiCert, Inc., Lehi, UT (US)

( * ) Notice: Subject to any disclaimer, the term of this patent is extended or adjusted under 35 U.S.C. 154(b) by 147 days.

(21) Appl. No.: 18/520,691

(22) Filed: Nov. 28, 2023

(65) Prior Publication Data

US 2025/0124177 A1 Apr. 17, 2025

(30) Foreign Application Priority Data

Oct. 16, 2023 (IN) .............................. 202341069977

(51) Int. Cl.
*G06F 21/85* (2013.01)
*G06F 21/44* (2013.01)
*G06F 21/60* (2013.01)

(52) U.S. Cl.
CPC .............. *G06F 21/85* (2013.01); *G06F 21/44* (2013.01); *G06F 21/604* (2013.01)

(58) Field of Classification Search
CPC ......... G06F 21/604; G06F 21/85; G06F 21/44
USPC ........................................................ 726/26
See application file for complete search history.

(56) References Cited

U.S. PATENT DOCUMENTS

| | | | | |
|---|---|---|---|---|
| 5,784,622 | A | * | 7/1998 | Kalwitz ............... H04L 69/18 710/200 |
| 8,661,436 | B2 | * | 2/2014 | Mckenzie ............ G06F 21/79 718/1 |
| 9,077,546 | B1 | | 7/2015 | Rakshit |
| 10,078,751 | B2 | * | 9/2018 | Austin ............... H04L 67/306 |
| 12,242,397 | B1 | * | 3/2025 | Teddy ............... G06F 13/4282 |
| 12,293,228 | B2 | * | 5/2025 | Jreij .................. G06F 11/3409 |
| 2011/0083017 | A1 | * | 4/2011 | Ali ...................... G06F 21/78 726/20 |
| 2014/0101754 | A1 | * | 4/2014 | Mckenzie ............ G06F 21/629 726/19 |
| 2016/0306963 | A1 | * | 10/2016 | Austin ................ G06F 21/53 |
| 2023/0300129 | A1 | | 9/2023 | Hojjati et al. |
| 2024/0241838 | A1 | * | 7/2024 | Andrews ............. G06F 8/65 |
| 2025/0110938 | A1 | * | 4/2025 | Bose .................. G06F 16/2228 |

FOREIGN PATENT DOCUMENTS

JP H08166920 A * 6/1996

* cited by examiner

*Primary Examiner* — Samson B Lemma
(74) *Attorney, Agent, or Firm* — Baratta Law PLLC; Lawrence A. Baratta, Jr.

(57) ABSTRACT

Systems and methods, implemented by a host machine, include, responsive to a peripheral device being coupled to the host machine and responsive to being granted access to data on the peripheral device, determining a presence of a change log on the peripheral device; responsive to a lack of the presence of the change log on the peripheral device, preventing access to the peripheral device; and, responsive to the presence of the change log on the peripheral device, allowing access to the peripheral device based on the change log.

17 Claims, 6 Drawing Sheets

SYSTEMS AND METHODS FOR IDENTIFYING PERIPHERAL DEVICES AND LOGGING OPERATIONS PERFORMED THEREON

FIELD OF THE DISCLOSURE

The present disclosure relates generally to computing. More particularly, the present disclosure relates to systems and methods for identifying peripheral devices and logging operations performed thereon.

BACKGROUND OF THE DISCLOSURE

When utilizing peripheral devices such as memory devices (e.g., Universal Serial Bus (USB) flash drives), contents of the peripheral devices can be copied, altered, and modified by a plurality of users, on a plurality of host machines over time. This can introduce risk due to there being no visibility associated with the actions performed on these peripheral devices. That is, peripheral devices offer no visibility associated with the actions including what content was modified, by who, on what machine, and when. Because of this, actions performed on content cannot be identifiable and cannot be traced back to the creator or modifier.

BRIEF SUMMARY OF THE DISCLOSURE

The present disclosure relates to systems and methods for identifying peripheral devices and logging operations performed thereon. That is, the present systems contemplate logging actions performed on peripheral devices in order to mitigate risk associated therewith. In various embodiments, peripheral devices are adapted to persist logs in specialized memory, the logs including information relating to the actions performed during a session, information about the user which performed the actions, information associated with the host machine used to perform the actions, and the like. Further, the systems and methods can allow users to revert the data on the peripheral device back to a historic state.

In various embodiments, the present disclosure includes a method having steps, a processing device configured to implement the steps, a cloud service configured to implement the steps, and a non-transitory computer-readable medium storing instructions for programming one or more processors to execute the steps. In an embodiment, the steps, implemented by a host machine, include, responsive to a peripheral device being coupled to the host machine and responsive to being granted access to data on the peripheral device, determining a presence of a change log on the peripheral device; responsive to a lack of the presence of the change log on the peripheral device, preventing access to the peripheral device; and, responsive to the presence of the change log on the peripheral device, allowing access to the peripheral device based on the change log.

The steps can further include, subsequent to the allowing access, writing updates to the change log based on one or more actions performed on the data on the peripheral device, wherein the updates are persisted to the change log stored on the peripheral device. The allowing access to the peripheral device based on the change log can include examining a history of the peripheral device from the change log and providing the access responsive to the peripheral device not having been used with unauthorized host machines. The steps can further include, prior to being granted access to the data on the peripheral device, performing authentication between the host device and the peripheral device. The authentication can include examining a certificate of the peripheral device and performing the authentication based thereon.

The peripheral device can be a memory device. The peripheral device can include specialized memory for storing the change log such that the change log is persisted in the specialized memory of the peripheral device. The host machine can be prevented from formatting a partition with the change log or deleting the change log. The change log can include a plurality of a log number, a Media Access Control (MAC) address or other identifier of any host machines to which the peripheral device has been connected, an Identification (ID) of a user, details of one or more actions performed, and a date and time when the one or more actions were performed.

In another embodiment, a peripheral device includes a communications interface configured to connect to a host machine; memory; and circuitry, wherein the communications interface, the memory, and the circuitry are communicatively coupled to one another, and wherein the circuitry is configured to, responsive to the communications interface being connected to the host, grant access to data in the memory; provide access to a change log stored on the peripheral device; and, responsive to the host machine authorizing the peripheral device based on the change log, performing one or more actions with the host machine. The circuitry can be further configured to write updates to the change log based on the one or more actions performed on the data on the peripheral device, wherein the updates are persisted to the change log stored on the peripheral device.

The circuitry can be further configured to, prior to granting access, provide a certificate stored in the memory to the host machine. The change log can be stored in the memory, and wherein the host machine is prevented from formatting a partition with the change log or deleting the change log. The change log can include a plurality of a log number, a Media Access Control (MAC) address or other identifier of any host machines to which the peripheral device has been connected, an Identification (ID) of a user, details of one or more actions performed, and a date and time when the one or more actions were performed.

In another embodiment, the steps include responsive to a peripheral device being coupled to a host machine, authenticating the host machine via one or more authentication techniques; based on the authenticating, granting access to data on the peripheral device; writing a log associated with one or more actions performed on the data on the peripheral device; and persisting the log, wherein the log includes information associated with the one or more actions performed on the data.

The steps can further include wherein the peripheral device is a memory device. The log can be persisted on the peripheral device. The peripheral device can include specialized memory for storing logs, wherein the log is persisted in the specialized memory of the peripheral device. The peripheral device can be adapted to not allow the specialized memory to be formattable by the host machine. The host machine can be adapted to authenticate the peripheral device before function of the peripheral device is granted on the host machine. The steps can further include examining a certificate of the peripheral device; and identifying the certificate as one of valid or expired. The steps can further include performing one of encrypting and hashing the log before persisting the log. The information can include a log number, a Media Access Control (MAC) address of the host machine, an Identification (ID) of a user, the one or more actions performed, and the date and time when the one or more actions were performed. The peripheral device can be adapted to, based on the authentication, deny access to data on the peripheral device, grant limited access to data on the peripheral device, or grant full access to data on the peripheral device.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for identifying peripheral devices and logging operations performed thereon. That is, the present systems contemplate logging actions performed on peripheral devices in order to mitigate risk associated therewith. In various embodiments, peripheral devices are adapted to persist logs in specialized memory, the logs including information relating to the actions performed during a session, information about the user which performed the actions, information associated with the host machine used to perform the actions, and the like. Further, the systems and methods can allow users to revert the data on the peripheral device back to a historic state.

Processing System

Figure 1:
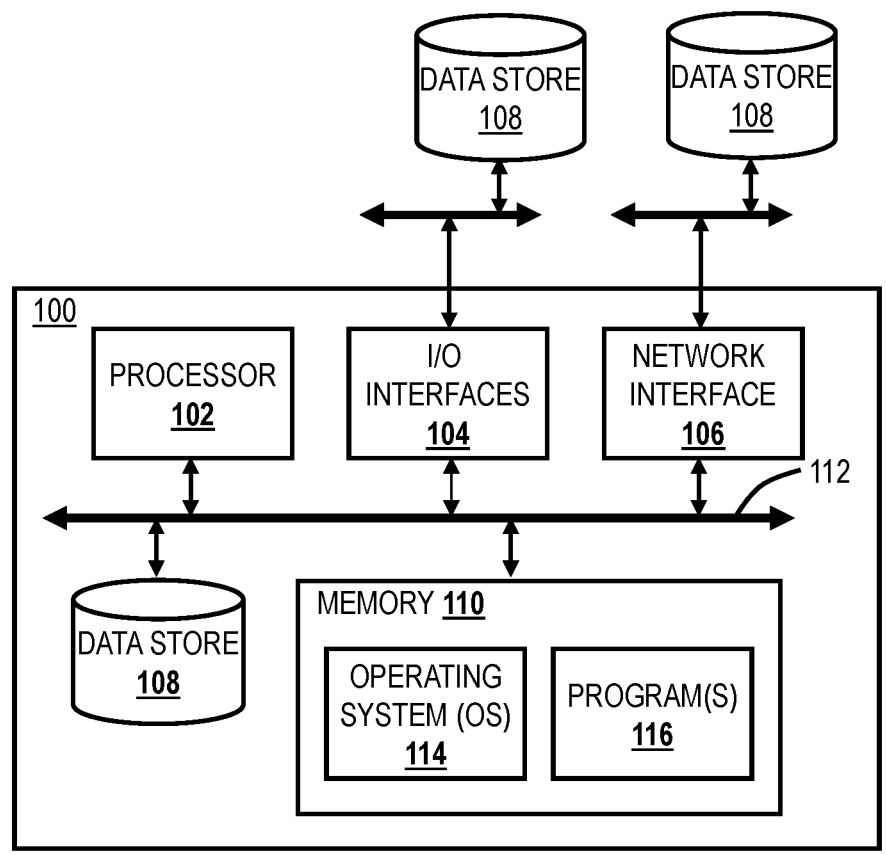
FIG. 1 is a block diagram of a processing system, which may implement any of the devices described herein.

FIG. 1 is a block diagram of a processing system 100, which may implement any of the devices described herein. The processing system 100 may be a digital computer that, in terms of hardware architecture, generally includes a processor 102, input/output (I/O) interfaces 104, a network interface 106, a data store 108, and memory 110. It should be appreciated by those of ordinary skill in the art that FIG. 1 depicts the processing system 100 in an oversimplified manner, and a practical embodiment may include additional components and suitably configured processing logic to support known or conventional operating features that are not described in detail herein. The components (102, 104, 106, 108, and 110) are communicatively coupled via a local interface 112. The local interface 112 may be, for example, but not limited to, one or more buses or other wired or wireless connections, as is known in the art. The local interface 112 may have additional elements, which are omitted for simplicity, such as controllers, buffers (caches), drivers, repeaters, and receivers, among many others, to enable communications. Further, the local interface 112 may include address, control, and/or data connections to enable appropriate communications among the aforementioned components.

The processor 102 is a hardware device for executing software instructions. The processor 102 may be any custom made or commercially available processor, a Central Processing Unit (CPU), an auxiliary processor among several processors associated with the processing system 100, a semiconductor-based microprocessor (in the form of a microchip or chipset), or generally any device for executing software instructions. When the processing system 100 is in operation, the processor 102 is configured to execute software stored within the memory 110, to communicate data to and from the memory 110, and to generally control operations of the processing system 100 pursuant to the software instructions. The I/O interfaces 104 may be used to receive user input from and/or for providing system output to one or more devices or components.

The network interface 106 may be used to enable the processing system 100 to communicate on a network, such as the Internet. The network interface 106 may include, for example, an Ethernet card or adapter or a Wireless Local Area Network (WLAN) card or adapter. The network interface 106 may include address, control, and/or data connections to enable appropriate communications on the network. A data store 108 may be used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 108 may incorporate electronic, magnetic, optical, and/or other types of storage media. In one example, the data store 208 may be located internal to the processing system 100, such as, for example, an internal hard drive connected to the local interface 112 in the processing system 100. Additionally, in another embodiment, the data store 108 may be located external to the processing system 100 such as, for example, an external hard drive connected to the I/O interfaces 104 (e.g., SCSI or USB connection). In a further embodiment, the data store 208 may be connected to the processing system 100 through a network, such as, for example, a network-attached file server.

The memory 110 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 110 may incorporate electronic, magnetic, optical, and/or other types of storage media. Note that the memory 110 may have a distributed architecture, where various components are situated remotely from one another but can be accessed by the processor 102. The software in memory 110 may include one or more software programs, each of which includes an ordered listing of executable instructions for implementing logical functions. The software in the memory 110 includes a suitable Operating System (O/S) 114 and one or more programs 116. The operating system 114 essentially controls the execution of other computer programs, such as the one or more programs 116, and provides scheduling, input-output control, file and data management, memory management, and communication control and related services. The one or more programs 116 may be configured to implement the various processes, algorithms, methods, techniques, etc. described herein.

Of note, the general architecture of the processing system 100 can define any device described herein. However, the processing system 100 is merely presented as an example architecture for illustration purposes. Other physical embodiments are contemplated, including virtual machines (VM), software containers, appliances, network devices, and the like.

In an embodiment, the various techniques described herein can be implemented via a cloud service. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. The phrase "Software as a Service" (SaaS) is sometimes used to describe application programs offered through cloud computing. A common shorthand for a provided cloud computing service (or even an aggregation of all existing cloud services) is "the cloud."

Peripheral Device Logging and Protection

The present disclosure provides systems and methods for protecting host machines from peripheral devices and logging activities associated with peripheral devices. In the present disclosure, a peripheral device can be contemplated as any device adapted to be communicatively coupled to a host machine, a host machine being any computing device adapted to have a peripheral device connected thereto. That is, peripheral devices can be, but are not limited to, Universal Serial Bus (USB) memory devices, USB drivers, Thunderbolt devices, mouse, keyboard, etc. Host machines can be laptops, desktops, tablets, mobile devices, etc.

When utilizing memory devices, contents of the memory devices can be copied, altered, and modified by different users over time. Although, how the contents of the memory devices are altered, and which data is modified in each session and by which party (e.g., device/person/malware) is not identifiable and not able to be traced back to the creator. This introduces risk because the history of changes made on the peripheral device is not logged, thus, malicious users can utilize these devices to attack critical infrastructure. For example, Stuxnet was introduced via infected USB flash drives.

Additionally, malicious actors are able to emulate different types of peripheral devices. For example, by emulating a keyboard input, a peripheral device can have the ability to record all keystrokes made on the host machine. This is a security concern due to the host machine and user being unaware of the peripheral devices' real intent.

Traditionally, in order to mitigate such attacks, enterprises have adopted the method of completely blocking any peripheral or hardware device from being able to be connected to the host machine either through the operating system or hardware. In this case, enterprises are putting security above useability. For example, banks, government, and other enterprises often have security policies that restrict the use of peripheral devices to prevent any security risks. While this achieves that goal, it presents a useability problem.

Peripheral devices such as memory devices or USB drives are a mode of data storage and act as portable memory devices, although, the history of data that is stored and transferred over these devices is not visible, thus, they do not provide control and visibility of the operations performed. This makes them vulnerable to carrying malware to host machines when connected. The malware can be copied to the host machines and at times, to remediate such attacks, users only have the option to erase all the data on the host machine. The ability to track data transferred through these peripheral devices, identify owners of the data, and identify permissions is necessary as data trust is a growing concern. In the present disclosure, systems and methods are described to identify and track the data origin and provide means for reverting data to a specific state of the peripheral device.

The present disclosure provides systems and methods for leveraging identity for hardware. That is, typically, the Operating System (OS) of the host machine only knows that it is a driver and cannot tell the difference between a valid peripheral device versus a peripheral device that includes malicious data. Not only do the present methods include utilizing identities of peripheral devices, but also leverage the capabilities of collecting and persisting audit logs/change logs. These change logs can include important information relating to the historic use of the peripheral device. For example, the change logs can include an identity of a user who has used the peripheral device, the host machines to which it was connected, the actions performed, when they were performed, and the like. Of note, the present disclosure uses the term change log or change logs, but those skilled in the art will recognize this can have other names such as a audit log, a log, a device history, history log, etc.

In many cases, peripheral devices do not have specific IDs, i.e., unique verifiable identifiers, associated with them, thus the host machine does not have an ID for the peripheral device. As an example, when plugging in a Multi-Factor Authentication (MFA) peripheral device such as a security key, the host machine will only have limited information about the peripheral device. An example of this limited information is shown below.

Product ID: 0x0407
Vendor ID: 0x1050
Version: 4.37
Speed: Up to 12 Mb/2
Manufacturer: Acme Corp.
Location ID: 0x001000000/1

In this case, the product ID and vendor ID are read off the peripheral device, the version is the version of the firmware run on the peripheral device, the manufacturer is the manufacturer of the peripheral device, and the location ID is the port to which the peripheral device is connected to. Thus, there is nothing that is unique, such as a serial number, that can be read from the peripheral device. Even with a serial number, all of the information can still be emulated to disguise malicious activity. That is, there is no certificate associated with peripheral devices. The present systems and methods do away with the need to identify peripheral devices because of the introduction of a change log. This is because, when the peripheral device is connected to any host machine, the history of that peripheral device will be visible.

In various embodiments, the peripheral device can be further adapted to hold a valid certificate. This certificate can then be presented to the operating system of the host machine for the host machine to be able to examine and determine if the certificate is valid or expired. Once the connection is accepted, a log will be written on the peripheral device that says there has been a successful connection to the host machine including information such as the identity of the specific host machine in addition to the change log information described herein. This log can then be stored in specialized memory of the peripheral device. In various embodiments, the certificate of the peripheral device can also be stored in this specialized storage to mitigate any removal, altering, etc. The specialized storage of the peripheral device is further described herein.

Various embodiments involve an architecture where a memory device (i.e., a peripheral device), when initiated with data transfer, is adapted to store the data content, the data owner details, and the host machine details. This information can be stored separately in either the peripheral device or the host machine. Various implementations of this architecture include a type of change log system and a partition system.

The change log system can include creating a log in the memory of the peripheral device with the data that is being written or read from the device. This log can then be encrypted or hashed using various hashing techniques which help when reverting to a specific state of the data. That is, the present systems are adapted to cause the peripheral device to persist a log which includes information associated with each action performed on the peripheral device and hash each log entry. Responsive to a user requesting to revert back to a previous state of the peripheral device, the systems can the data on the peripheral device back to that state. In various embodiments, each transfer session/action is associated with the device specific data that can include Media Access Control (MAC) address, device certificate, user login details, etc. This data can then be used to uniquely identify the data, the host machine to which it was coupled, and/or the transfer owner, i.e., the user which performed the action on the data.

When utilizing a partition system, all data, once transferred, can be signed by the user using the peripheral device or a user certificate. When the peripheral device gets appended with more data or malware which is different than the original, it can be easily identified and alerted to the user and can also be reverted to the session signed state. That is, once a user is done using the peripheral device, the systems can persist a signed state of the data on the peripheral device. This peripheral device can then be reverted back to this signed session state.

The various implementations described herein may vary, although all implementations are adapted to achieve the purpose of digital fingerprinting data that is transferred via a peripheral device. Further, in various embodiments, the systems can utilize a multiple version implementation, where each update to the data on a peripheral device would be stored. That is, the versions of the data that are updated in sessions are stored, and can thereby be reverted to a particular session.

In various embodiments, the present systems and methods also have the ability to restrict the read access and note the read logs or copy logs. Similarly, device identification would be used to identify the owner of the device and if that device has access to the data. It will note down which data is being read by which user in which session, and if any of the data is restricted to access in specific devices. This helps to selectively hide or restrict the data that can be read on memory devices.

Figure 2:
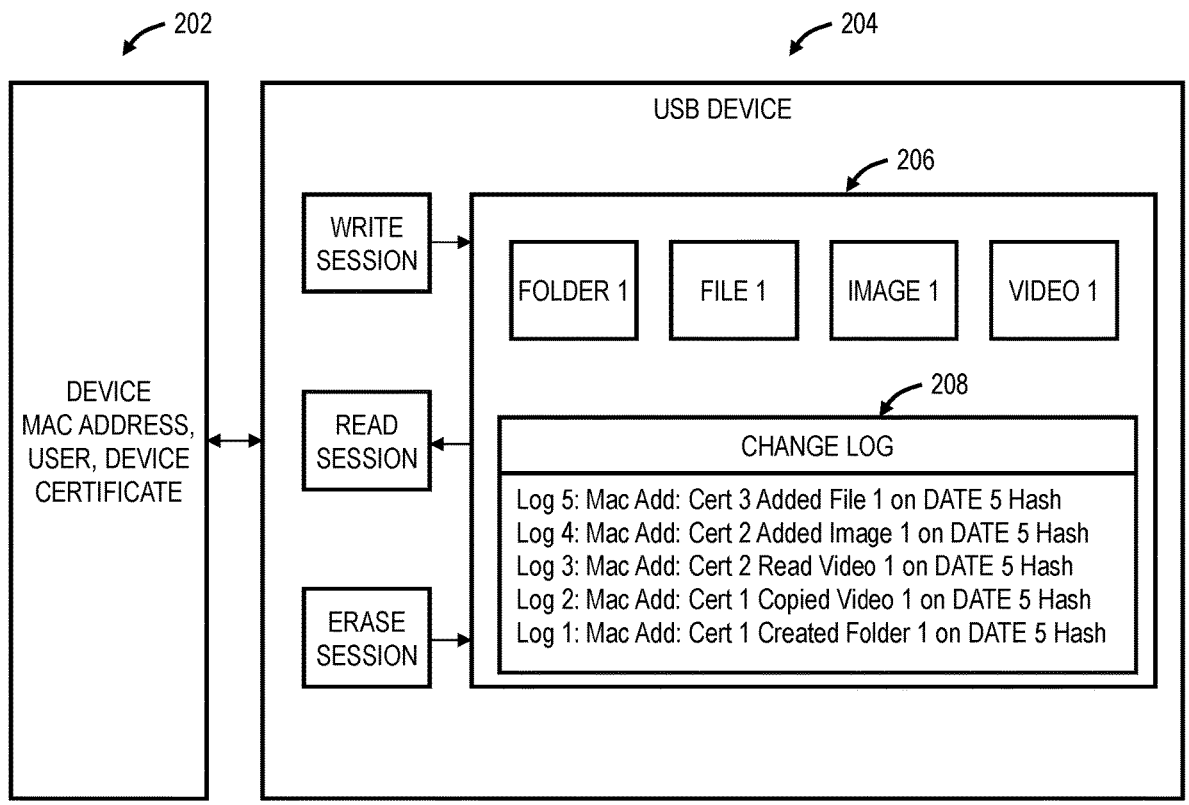
FIG. 2 is a diagram of a peripheral device communicatively coupled to a host machine.

FIG. 2 is a diagram of a peripheral device 204 communicatively coupled to a host machine 202. As is typical with memory peripheral devices, such as USB drives, once the peripheral device 204 is connected to the host machine 202, a window 206 can be displayed, in this case displaying the various files on the USB drive. In various embodiments, this window can be further adapted to display a change log 208.

Again, this change log 208 displays the history of events/actions performed on the peripheral device 204, in this case changes made to the files on the USB drive. Each entry in the change log includes, but is not limited to, a log number, MAC address of the host machine 202 associated with the log, ID of the user performing the action (Cert), the action performed, and the date and time performed. Note, while FIG. 2 lists the peripheral device 202 as a USB device, those skilled in the art will recognize other types of peripheral devices 202 are contemplated, both in terms of connectivity to the host machine 204 and in terms of functions, e.g., not limited to flash or memory devices.

Of note, the host machine 204 can include a functional architecture similar to the processing system 100. Also, the peripheral device 202 can also include a similar functional architecture as the process system 100, omitting some components, such as the network interface, processor, etc.

This change log can be stored on the peripheral device 204 or the host machine 202. In various embodiments, the systems and methods include utilizing specialized hardware that is not removable on the peripheral device 204. This specialized hardware can be adapted to enable storage of the change log. This storage is not able to be formatted or removed from the peripheral device 204. This can further be contemplated as a partition, wherein the specialized hardware incudes memory that is not formattable by the OS of the host machine 202. Further, in various embodiments, in order to facilitate additional security, the host machines 202 can be adapted to only allow function of the peripheral device responsive to the presence of the change log as well as based on possibly reviewing details in the change log. That is, if a peripheral device 204 that does not include a change log is connected to a host machine 202, that host machine 202 will not allow that peripheral device to function. Because of this, enterprise host machines 202 can refuse peripheral devices which are not part of a pre-approved "allow list", thus mitigating the risk of attacks through peripheral devices 204.

In an embodiment, the host machine 202 can evaluate the peripheral device 204 based on the change log and only allow if certain conditions are met (e.g., the peripheral device 204 only previously connected to trusted host machines 202, and the like). In comparison to traditional techniques of blocking peripheral devices 204, the host machines 202 do not completely block all peripheral devices 204, but can actively decide whether to allow a specific peripheral device 204 to connect or not. This greatly increases the usability of host machines 202 without increasing risk. Further, the host machine 202 can be adapted to alert the user that the peripheral device 204 which they are using has malware on it.

Figure 3:
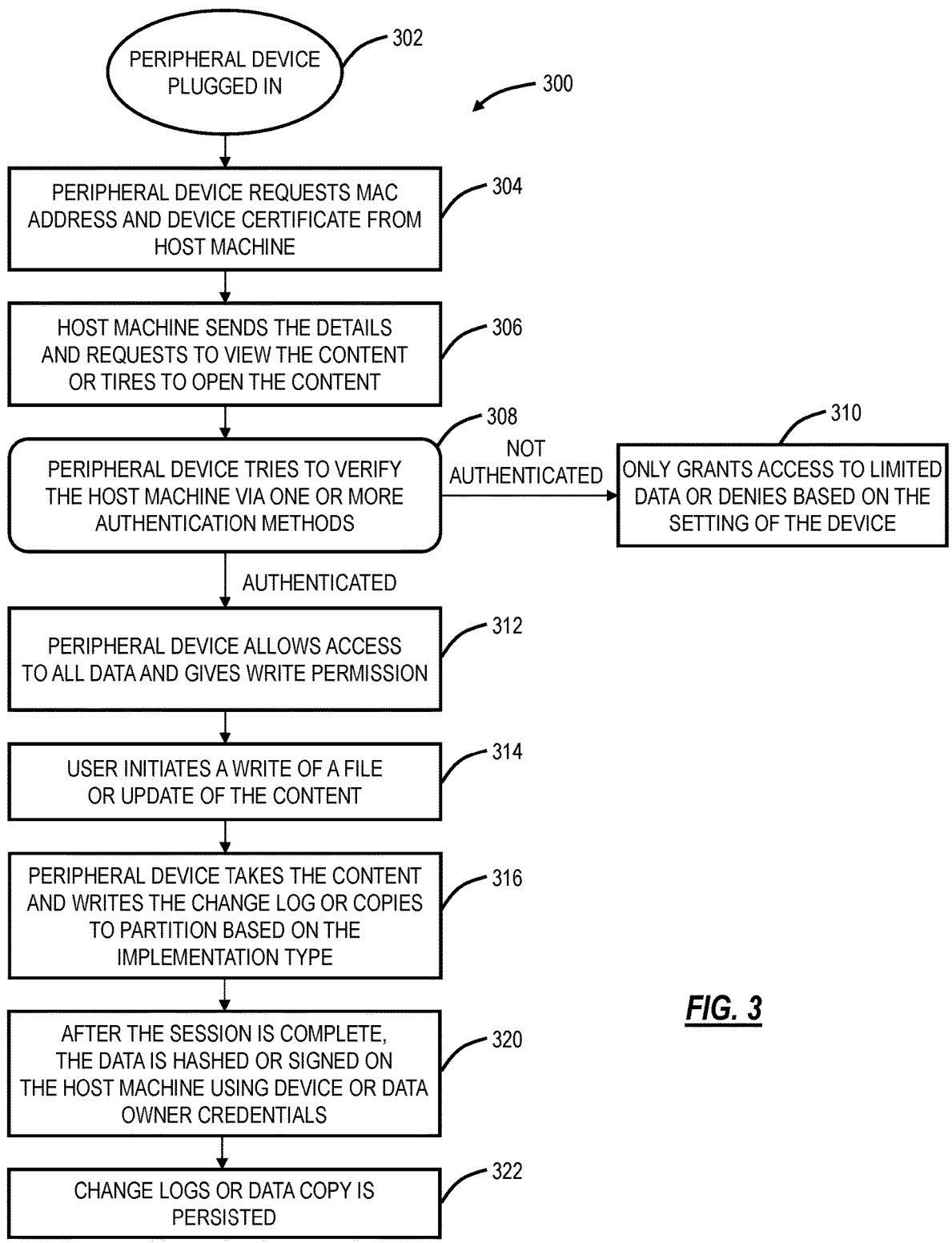
FIG. 3 is a flow chart of a write session between a peripheral device and a host machine.

FIG. 3 is a flow chart of a write session 300 between a peripheral device 204 and a host machine 202. Responsive to the peripheral device being communicatively coupled to the host machine (step 302), i.e., through physical connection via a port or wirelessly, the peripheral device is adapted to request various identification credentials from the host machine including the MAC address and device certificate (step 304). The host machine then sends the required credentials and can request to view the content of the peripheral device or tries to open the content (step 306). The peripheral device can then attempt to verify the host machine via one or more authentication techniques such as certificate authentication and the like (step 308). Note, in some embodiments, there can be no authentication between the peripheral device and the host machine.

Responsive to the host machine not being authenticated based on the authentication (step 308), the peripheral device can grant restricted access to data therein or deny all access to the data based on the peripheral device's configuration (step 310). Restricted access can include only allowing limited access, i.e., allowing the host machine to access limited data on the peripheral device. The access to limited data can be based on a security level of the data, which can be preconfigured. For example, the peripheral device can allow limited access to data that is defined as "low risk" and not confidential, protected, etc.

Responsive to the host machine being authenticated (step 308), the peripheral device can grant access to all data therein and also provide write permission (step 312). Based on the user initiating a "write" of a file or update of the content thereon (step 314), the peripheral device can take the content and write a change log and/or copy the content to a partition based on the configuration (step 316). After the session is complete, the data can be hashed or signed on the host machine using the device or data owner credentials (step 318). Then, the change log or data copy is persisted (step 320), the data copy being persisted so that the peripheral device can be reverted to a previous state in the future. Additionally, the change log can be used in the future for determining risk, history, etc. associated with the peripheral device.

Figure 4:
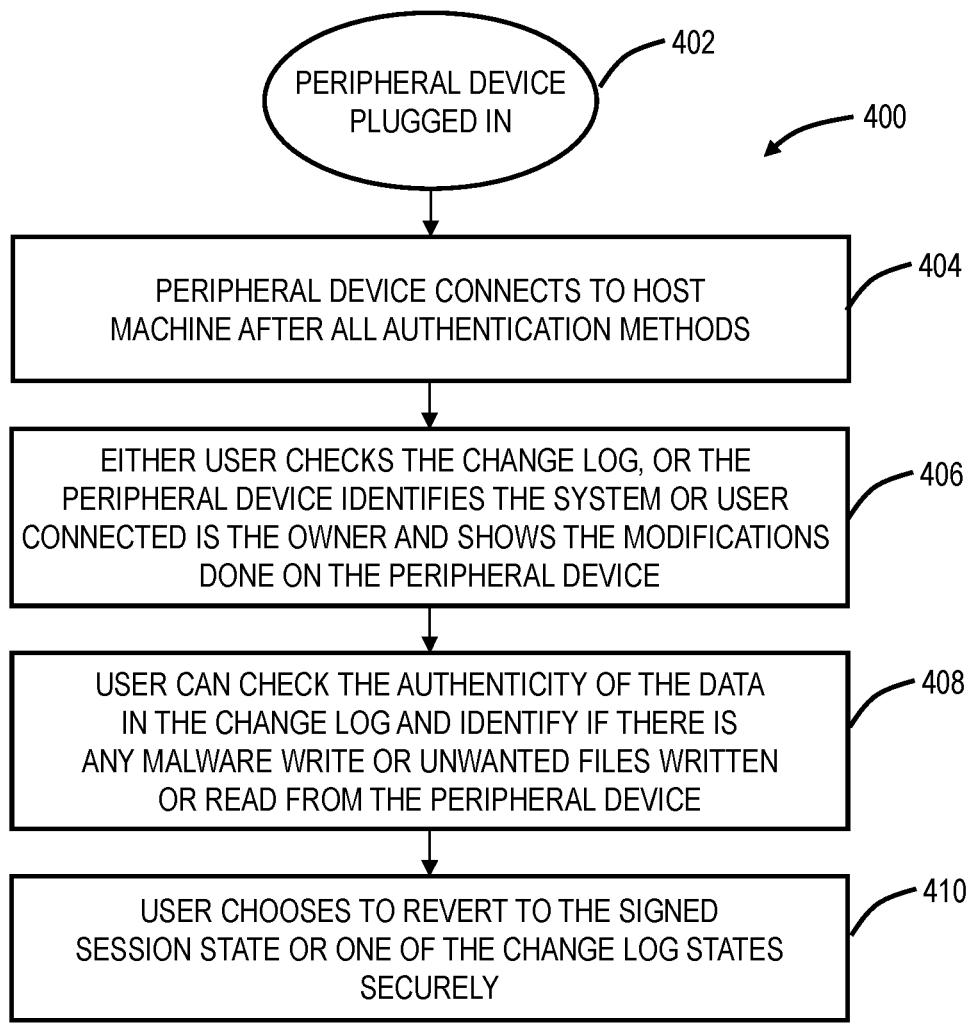
FIG. 4 is a flow chart of a read session between a peripheral device and a host machine.

FIG. 4 is a flow chart of a read session 400 between a peripheral device and a host machine. Responsive to the peripheral device being communicatively coupled to the host machine (step 402), i.e., through physical connection via a port or wirelessly, and based on results of the authentication, the peripheral device connects to the host machine (step 404). The peripheral device can be adapted to, based on identifying the host machine or identifying the user as the owner, show the change log including all modifications done on the peripheral device (step 406). The user and/or the host machine can then check the authenticity of the data in the change log and identify if there is any malware write or unwanted files written or read from the peripheral device (step 408). Based on this, the user can revert the peripheral device back to a signed state or one of the change log states securely (step 410). That is, the peripheral device is adapted to be reverted to any data state associated with any of the change log entries, i.e., the state at which the peripheral device was at the time of the change log entry. Further, the peripheral device is adapted to be reverted to any signed session state persisted on the peripheral device.

Figure 5:
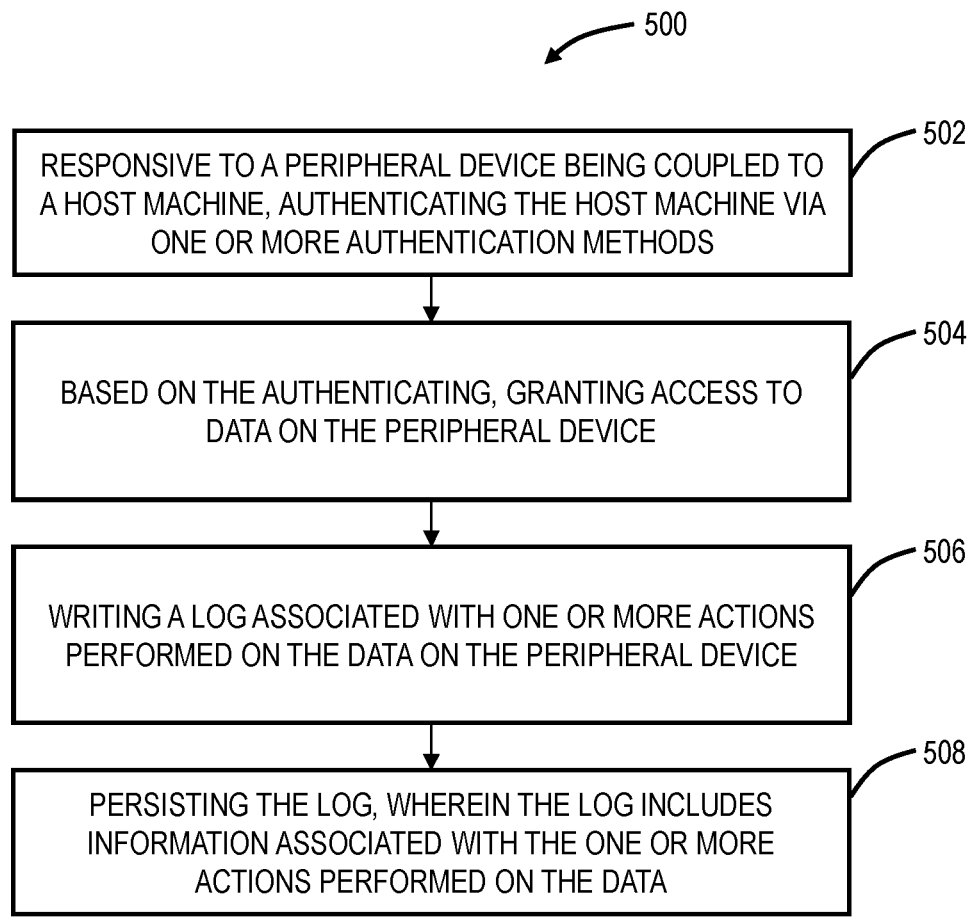
FIG. 5 is a flow chart of a process for identifying peripheral devices and logging operations performed thereon.

Process for Identifying Peripheral Devices and Logging Operations Performed Thereon FIG. 5 is a flow chart of a process 500 for identifying peripheral devices and logging operations performed thereon. The process 500 contemplates implementation as a method having steps, via a processing device in a smart device configured to implement the steps, and via a non-transitory computer-readable medium storing instructions for programming one or more processors to execute the steps. Various embodiments include responsive to a peripheral device being coupled to a host machine, authenticating the host machine via one or more authentication methods (step 502); based on the authenticating, granting access to data on the peripheral device (step 504); writing a log associated with one or more actions performed on the data on the peripheral device (step 506); and persisting the log, wherein the log includes information associated with the one or more actions performed on the data (step 508).

The process 500 can further include wherein the peripheral device is a memory device. The log can be persisted on the peripheral device. The peripheral device can include specialized memory for storing logs, wherein the log is persisted in the specialized memory of the peripheral device. The peripheral device can be adapted to not allow the specialized memory to be formattable by the host machine. The host machine can be adapted to authenticate the peripheral device before function of the peripheral device is granted on the host machine. The steps can further include examining a certificate of the peripheral device; and identifying the certificate as one of valid or expired. The steps can further include performing one of encrypting and hashing the log before persisting the log. The information can include a log number, a Media Access Control (MAC) address of the host machine, an Identification (ID) of a user, the one or more actions performed, and the date and time when the one or more actions were performed. The peripheral device can be adapted to, based on the authentication, deny access to data on the peripheral device, grant limited access to data on the peripheral device, or grant full access to data on the peripheral device.

Process Analyzing Peripheral Devices and their History

Figure 6:
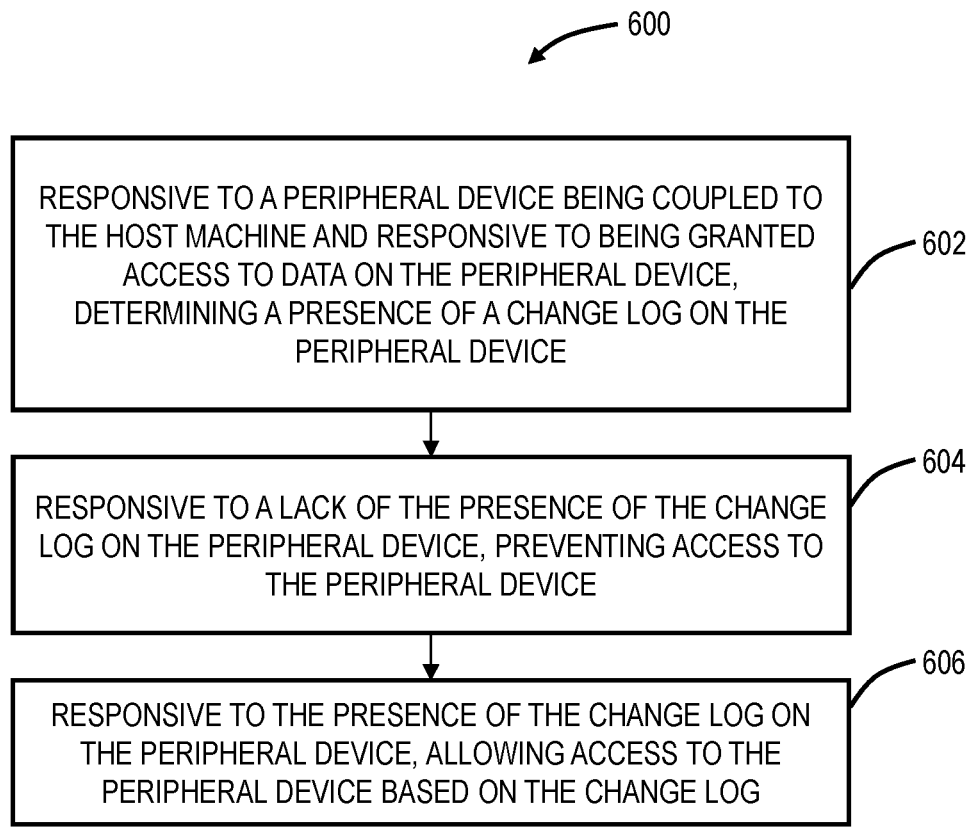
FIG. 6 is a flow chart of a process for analyzing peripheral devices and their history before allowing host machine access.

FIG. 6 is a flow chart of a process 600 for analyzing peripheral devices and their history before allowing host machine access. The process 600 contemplates implementation as a method having steps, via a processing device in a smart device configured to implement the steps, and via a non-transitory computer-readable medium storing instructions for programming one or more processors to execute the steps. The process 600 is described with reference to the host machine 202.

The process 600 includes, responsive to a peripheral device being coupled to the host machine and responsive to being granted access to data on the peripheral device, determining a presence of a change log on the peripheral device (step 602); responsive to a lack of the presence of the change log on the peripheral device, preventing access to the peripheral device (step 604); and, responsive to the presence of the change log on the peripheral device, allowing access to the peripheral device based on the change log (step 606). Here, the host machine 202 is configured to allow peripheral devices 204, but only when there is the change log. The idea here is to provide a balance between usability and security, i.e., we are not blocking all peripheral devices 204 nor are we allowing all peripheral devices 204, rather we are allowing peripheral devices 204 when we can determine they are safe.

In an embodiment, the allowing access to the peripheral device based on the change log can include examining a history of the peripheral device from the change log and providing the access responsive to the peripheral device not having been used with unauthorized host machines. For example, one approach can be only to allow peripheral devices that were used on known, safe machines, e.g., host machines under control of an enterprise, etc. Another approach can look at the history for the users, the content, etc. That is, any approach is contemplated where there is some indication the peripheral device is safe. In another embodiment, the access can be granted simply based on the presence of the change log, i.e., the assumption being the peripheral device is safe because we can look at its history. In further embodiments, the host machine may reach out to a cloud service to provide details of the change log for a go/no-go decision by the cloud service.

The process 600 can further include, subsequent to the allowing access, writing updates to the change log based on one or more actions performed on the data on the peripheral device, wherein the updates are persisted to the change log stored on the peripheral device. That is, the change log can be updated based on the usage with the current host machine, so in the future, other host machines can determine the history.

The process 600 can further include, prior to being granted access to the data on the peripheral device, performing authentication between the host device and the peripheral device. The authentication can include examining a certificate of the peripheral device and performing the authentication based thereon.

The peripheral device can be a memory device. The peripheral device can include specialized memory for storing the change log such that the change log is persisted in the specialized memory of the peripheral device. The host machine can be prevented from formatting a partition with the change log or deleting the change log.

The change log can include a plurality of a log number, a Media Access Control (MAC) address or other identifier of any host machines to which the peripheral device has been connected, an Identification (ID) of a user, details of one or more actions performed, and a date and time when the one or more actions were performed.

Peripheral Device

In another embodiment, a peripheral device includes a communications interface configured to connect to a host machine; memory; and circuitry, wherein the communications interface, the memory, and the circuitry are communicatively coupled to one another, and wherein the circuitry is configured to, responsive to the communications interface being connected to the host, grant access to data in the memory; provide access to a change log stored on the peripheral device; and, responsive to the host machine authorizing the peripheral device based on the change log, performing one or more actions with the host machine.

The circuitry can be further configured to write updates to the change log based on the one or more actions performed on the data on the peripheral device, wherein the updates are persisted to the change log stored on the peripheral device. The circuitry can be further configured to prior to granting access, provide a certificate stored in the memory to the host machine. The change log can be stored in the memory, and wherein the host machine is prevented from formatting a partition with the change log or deleting the change log. The change log can include a plurality of a log number, a Media Access Control (MAC) address or other identifier of any host machines to which the peripheral device has been connected, an Identification (ID) of a user, details of one or more actions performed, and a date and time when the one or more actions were performed.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method, implemented by a host machine, comprising steps of:
responsive to a peripheral device being coupled to the host machine and responsive to being granted access to data on the peripheral device, determining a presence of a change log on the peripheral device;
responsive to a lack of the presence of the change log on the peripheral device, preventing access to the peripheral device;
responsive to the presence of the change log on the peripheral device, allowing access to the peripheral device based on the change log; and
subsequent to the allowing access, writing updates to the change log based on one or more actions performed on the data on the peripheral device, wherein the updates are persisted to the change log stored on the peripheral device.

2. The method of claim 1, wherein the allowing access to the peripheral device based on the change log includes:
examining a history of the peripheral device from the change log and providing the access responsive to the peripheral device not having been used with unauthorized host machines.

3. The method of claim 1, wherein the steps further include:
   prior to being granted access to the data on the peripheral device, performing authentication between the host device and the peripheral device.

4. The method of claim 3, wherein the authentication includes:
   examining a certificate of the peripheral device and performing the authentication based thereon.

5. The method of claim 1, wherein the peripheral device is a memory device.

6. The method of claim 5, wherein the peripheral device includes specialized memory for storing the change log such that the change log is persisted in the specialized memory of the peripheral device.

7. The method of claim 5, wherein the host machine is prevented from formatting a partition with the change log or deleting the change log.

8. The method of claim 1, wherein the change log includes a plurality of a log number, a Media Access Control (MAC) address or other identifier of any host machines to which the peripheral device has been connected, an Identification (ID) of a user, details of one or more actions performed, and a date and time when the one or more actions were performed.

9. A non-transitory computer-readable medium comprising instructions that, when executed, cause one or more processors in a host machine to perform steps of:
   responsive to a peripheral device being coupled to the host machine and responsive to being granted access to data on the peripheral device, determining a presence of a change log on the peripheral device;
   responsive to a lack of the presence of the change log on the peripheral device, preventing access to the peripheral device;
   responsive to the presence of the change log on the peripheral device, allowing access to the peripheral device based on the change log; and
   subsequent to the allowing access, writing updates to the change log based on one or more actions performed on the data on the peripheral device, wherein the updates are persisted to the change log stored on the peripheral device.

10. The non-transitory computer-readable medium of claim 9, wherein the allowing access to the peripheral device based on the change log includes:
   examining a history of the peripheral device from the change log and providing the access responsive to the peripheral device not having been used with unauthorized host machines.

11. The non-transitory computer-readable medium of claim 9, wherein the steps further include:
   prior to being granted access to the data on the peripheral device, performing authentication between the host device and the peripheral device.

12. The non-transitory computer-readable medium of claim 9, wherein the peripheral device is a memory device.

13. The non-transitory computer-readable medium of claim 9, wherein the change log includes a plurality of a log number, a Media Access Control (MAC) address or other identifier of any host machines to which the peripheral device has been connected, an Identification (ID) of a user, details of one or more actions performed, and a date and time when the one or more actions were performed.

14. A peripheral device comprising:
   a communications interface configured to connect to a host machine;
   memory; and
   circuitry, wherein the communications interface, the memory, and the circuitry are communicatively coupled to one another, and wherein the circuitry is configured to:
   responsive to the communications interface being connected to the host, grant access to data in the memory;
   provide access to a change log stored on the peripheral device;
   responsive to the host machine authorizing the peripheral device based on the change log, performing one or more actions with the host machine; and
   write updates to the change log based on the one or more actions performed on the data on the peripheral device, wherein the updates are persisted to the change log stored on the peripheral device.

15. The peripheral device of claim 14, wherein the circuitry is further configured to:
   prior to granting access, provide a certificate stored in the memory to the host machine.

16. The peripheral device of claim 14, wherein the change log is stored in the memory, and wherein the host machine is prevented from formatting a partition with the change log or deleting the change log.

17. The peripheral device of claim 14, wherein the change log includes a plurality of a log number, a Media Access Control (MAC) address or other identifier of any host machines to which the peripheral device has been connected, an Identification (ID) of a user, details of one or more actions performed, and a date and time when the one or more actions were performed.

* * * * *